US006503611B1

(12) United States Patent
Chang et al.

(10) Patent No.: US 6,503,611 B1
(45) Date of Patent: Jan. 7, 2003

(54) COLD SEAL RELEASE BIAXIALLY ORIENTED POLYPROPYLENE FILM FOR PACKAGING WITH STABLE RELEASE PROPERTIES

(75) Inventors: Keunsuk P. Chang, N. Kingstown, RI (US); A. Michael Nahmias, N. Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 0 days.

(21) Appl. No.: 09/383,731

(22) Filed: Aug. 26, 1999

Related U.S. Application Data
(60) Provisional application No. 60/111,598, filed on Dec. 2, 1998.

(51) Int. Cl.$^7$ ................................................ B32B 27/32
(52) U.S. Cl. ........................ 428/213; 428/215; 428/352; 428/402; 428/447; 428/516; 428/409
(58) Field of Search ................................. 428/516, 447, 428/409, 402, 352, 213, 215

(56) References Cited

U.S. PATENT DOCUMENTS

| | | | | |
|---|---|---|---|---|
| 3,932,330 A | * | 1/1976 | Lakshmanan | ............... 428/355 |
| 4,394,235 A | | 7/1983 | Brandt et al. | ............... 204/165 |
| 4,419,411 A | | 12/1983 | Park | ............................. 428/516 |
| 4,533,509 A | | 8/1985 | Gust et al. | ................... 264/171 |
| 4,590,125 A | | 5/1986 | Balloni et al. | .............. 428/349 |
| 4,659,612 A | | 4/1987 | Balloni et al. | .............. 428/213 |
| 4,692,379 A | | 9/1987 | Keung et al. | ............... 428/349 |
| 4,725,466 A | | 2/1988 | Crass et al. | .................... 428/35 |
| 4,764,425 A | | 8/1988 | Balloni et al. | .............. 428/331 |
| 4,785,042 A | * | 11/1988 | Azuma et al. | .............. 524/210 |
| 4,855,187 A | | 8/1989 | Osgood, Jr. et al. | ........ 428/516 |
| 4,919,934 A | * | 4/1990 | Decker et al. | .............. 424/401 |
| 5,271,976 A | * | 12/1993 | Kondo et al. | .............. 428/35.2 |
| 5,441,802 A | * | 8/1995 | Mizuno et al. | ............. 428/327 |
| 5,482,780 A | | 1/1996 | Wilkie et al. | ............... 428/515 |
| 5,489,473 A | | 2/1996 | Wilkie | ........................ 428/323 |

FOREIGN PATENT DOCUMENTS

| | | |
|---|---|---|
| EP | 0 353 368 | 7/1990 |
| WO | 94/14606 | 7/1994 |

* cited by examiner

Primary Examiner—D. Lawrence Tarazano
(74) Attorney, Agent, or Firm—Morrison & Foerster LLP

(57) ABSTRACT

A polypropylene film contains a non-migratory slip and release additive package of a synthetic or mineral wax, an aluminosilicate additive, and optionally a silicone oil and a crosslinked silicone polymer resin. This film has excellent and stable cold seal adhesive release properties and exhibits a marked improvement in stable slipperiness, excellent transparency, excellent printability, and no cold seal adhesive deadening.

12 Claims, No Drawings

COLD SEAL RELEASE BIAXIALLY ORIENTED POLYPROPYLENE FILM FOR PACKAGING WITH STABLE RELEASE PROPERTIES

This application claims priority from Provisional Application Serial No. 60/111,598, filed Dec. 2, 1998.

FIELD OF INVENTION

This invention relates to a polypropylene film containing a non-migratory slip and release additive package of a synthetic or mineral wax, an aluminosilicate additive, and optionally a silicone oil and a crosslinked silicone polymer resin. This film has excellent and stable cold seal adhesive release properties and exhibits a marked improvement in stable slipperiness, excellent transparency, excellent printability, and no cold seal adhesive deadening.

BACKGROUND OF INVENTION

A biaxially oriented polypropylene film used for cold seal release applications often performs multiple functions. It must perform in a lamination as a slip film with low COF; it must perform as a print film with good optical clarity, gloss and ink adhesion; and it must perform as a cold seal release film such that the cold seal adhesive does not stick to the film while in wound roll form.

Traditional methods for producing a functional cold seal release film have often relied upon amide-type additives. These fatty amides (e.g. erucamide, stearamide, behenamide) bloom to the surface of the film. The amide molecule has a hydrophobic and non-polar end, which tends to repel the cold seal adhesive—whose molecules are polar and hydrophilic—and thus the cold seal adhesive does not adhere strongly to the release surface containing the amides. However, the drawback of such additives is their migratory behavior in polyolefin films. The amount of additive bloom to the surface can vary with environmental conditions, and thus release properties can vary greatly depending on storage conditions seasonal changes in humidity and temperature, or geographical differences in temperature and humidity. Warmer storage conditions tend to enhance blooming of these amides, whereas cool storage conditions tend to slow the migration process. If too little additive blooms, the laminated film may "block"—the cold seal adhesive does not release from the release film and the roll cannot be unwound. If too much additive blooms, the amides can migrate or transfer to the cold seal adhesive itself—this results in "deadening" of the cold seal adhesive and a consequent loss of adhesion strength.

In addition, the use of fatty amide additives also tends to make the film hazy and less glossy. This is undesirable from the point of view of print graphics appeal. Moreover, the migratory nature of the amide additive packages make them prone to bloom to the print surface of the release film or transfer from the release surface to the print surface when in wound roll form. The presence of amides on the print surface can interfere with the wettability and adhesion of water-based inks and, especially for process print applications, cause bridging of ink dots or inconsistent dot shapes and sizes. This results in muddier colors or images and a loss of graphic appeal.

Because the cold seal release film is often used in laminations with a heat-sealable and/or barrier polyolefin film, it must also act as a slip film for good packaging machinability. The use of fatty amides are very good in providing a low COF (coefficient of friction) surface, provided they have bloomed to the surface properly. However, the variability of the slip properties of a migratory fatty amide can be highly dependent upon environmental conditions as mentioned previously. If not enough additive blooms to the slip surface, the film's COF is higher and poor machinability can result from too much friction; if too much additive blooms, the film's COF can be too low, resulting in poor machinability due to the film being too slippery.

SUMMARY OF THE INVENTION

An objective of this invention is to solve the aforesaid problems of conventional cold seal release films by providing an additive system that is essentially non-migratory. This will result in a cold seal release film with stable release properties, stable slip and COF properties, and no cold seal adhesive deadening. In addition, such a film will offer excellent printability and transparency.

One aspect of the present invention is a polyolefin-based laminate film comprising at least 2 layers:
  a) a first polyolefin-based resin layer having a surface treated by a discharge treatment method that imparts excellent printability; and
  b) a polyolefin-based mixed resin layer formed on one surface of the first polyolefin-based resin layer opposite of the surface treatment,
wherein the polyolefin-based mixed resin layer contains a first additive material in an amount of about 2–10% by weight of the polyolefin-based mixed resin layer which is at least one component selected from the group consisting of synthetic waxes or mineral-derived waxes and a second additive comprising an amount of about 0.10–0.50% by weight of the polyolefin-based mixed resin layer of an amorphous aluminosilicate, and optionally one or more component selected from the group consisting of an amount of about 0.10–0.50% by weight of the polyolefin-based mixed resin layer of a crosslinked silicone polymer and an amount of about 0.02–0.5% by weight of the polyolefin-based mixed resin layer of a silicone oil.

According to this invention, the above objective is achieved by a propylene polymer film composed of a composition comprising a 2-layer coextruded film, with the print surface modified with a discharge treatment method; and the release surface modified with a non-migratory non-polar mineral or synthetic wax additive for excellent cold seal release properties and a non-migratory silicate powder additive, and/or a crosslinked silicone polymer resin, and/or a silicone oil, for good slip and antiblock properties.

DETAILED DESCRIPTION OF THE INVENTION

Materials which may be employed for the biaxially oriented layer are propylene homo-copolymers or copolymers of propylene and other α-olefins having 2 to 10 carbon atoms. In the case of copolymers, the amount of α-olefin subjected to copolymerization is less than 5% based on the weight of the copolymer as a standard. If the amount of copolymer exceeds this level, the biaxially oriented layer becomes too soft, with consequent insufficient service strength of the laminate film. Into the biaxially oriented layer various additives may be introduced (normally in the range of 0.01 to 2% based on the weight of the biaxially oriented layer as a standard). These include various additives known as additives for polypropylene, for example, stabilizers, anti-oxidants, ultra-violet absorbers, plasticizers, antistatic agents, anti-blocking agents, organic lubricants, pigments, coloring agents, nucleating agents, etc. Similarly, other kinds of polymers known as suitable for mixing into polypropylene may be added, for example, polyethylene, polybutene-1, poly(4-methylpentene-1), etc. These may be added by mixing in an amount of about 0.1 to 5% based on the weight of the biaxially oriented layer.

In a preferred embodiment, the first polyolefin-based resin layer has a thickness of about 6–40 μm. In another embodiment, this polyolefin-based resin layer is made of polypropylene-based resin. The polyolefin-based mixed resin layer has a thickness of about 0.2–5.0 μm.

In another embodiment, at least one component of the first additive material is a synthetic or mineral wax having a viscosity at 210° F. of 40–150 ssu per ASTM D88, penetration at 77° F. of 0–25 dmm per ASTM D1321, and melting point of 175–220° F. per ASTM D127; or a synthetic or mineral wax having a viscosity at 300° F. of 200–400 ssu per ASTM D88, penetration at 77° F. of 0.0–25 dmm per ASTM 1321, and melting point of 200–300° F. per ASTM D127.

In another embodiment, at least one component of the second additive material is an amorphous sodium calcium aluminosilicate having a particle size of 2–5 μm and a bulk density of 0.30–0.80 g/cm$^3$; or an amorphous aluminosilicate having a particle size of 2–5 μm and a bulk density of 0.10–0.30 g/cm$^3$.

In another embodiment, at least one component of the second additive material is a crosslinked silicone resin having a spherical average particle size of 2–5 μm, specific gravity of 1.32 at 25° F., bulk density of 0.15–0.50, and linseed oil absorption rate of 50–90 ml/100 g or a silicone oil having viscosity of 300–400 cSt., specific gravity at 77° F. of 0.90–0.99, and volatile content of 0.001–0.005%.

EXAMPLE 1

One hundred parts by weight of a crystalline propylene homopolymer resin; 4 parts by weight of a synthetic polyethylene wax having a viscosity at 210° F. of 48–60 ssu and a melting point of 182–198° F.; and 0.005 parts by weight of a sodium calcium aluminosilicate powder having a mean particle diameter of 3 μm were blended together for the mixed resin layer, coextruded, and biaxially oriented to produce a 2-layer film where the mixed resin layer was 0.5 μm thick and the accompanying coextruded propylene homopolymer layer was 12 μm in thickness. The total oriented film thickness was 12.5 μm or 50 G or 0.5 mil thick. The film was then treated on the homopolymer side (the print surface); the mixed resin layer side was left untreated (the release side); and wound in roll form. The cold seal release properties, cold seal adhesive seal strength, COF static and dynamic, haze, and print surface wetting tension were tested after the film was produced.

EXAMPLE 2

Example 1 was repeated except that the amount of wax added was changed to 8 parts by weight.

EXAMPLE 3

Example 1 was repeated except that the amount of aluminosilicate added was changed to 0.0025 parts by weight.

EXAMPLE 4

Example 2 was repeated except that a mineral-derived microcrystalline wax having a viscosity at 210° F. of 95–125 ssu and a melting point of 193–201 ° F. was used in place of the synthetic polyethylene wax.

EXAMPLE 5

Example 2 was repeated except that a synthetic polymethylene (Fisher-Tropsch) wax having a viscosity at 210° F. of 9.7–13.5 cp and a melting point of 199–209° F. was used in place of the synthetic polyethylene wax.

EXAMPLE 6

Example 2 was repeated except that a synthetic polymethylene (Fisher-Tropsch) wax having a viscosity at 300° F. of 4.5–8.3 cp and a melting point of 212–224° F. was used in place of the synthetic polyethylene wax.

EXAMPLE 7

Example 1 was repeated except that 0.003 parts by weight of a crosslinked silicone resin of 3.0 μm size were added.

EXAMPLE 8

Example 7 was repeated except that 0.0004 parts by weight of a silicone oil having a viscosity of 350 cSt. and a specific gravity of 0.97 were added.

Comparative Example 1

Example 1 was repeated except that 0.0008 parts by weight of stearamide with 95% amide, acid value 4, and melting range 208–226° F. were used in place of the synthetic polyethylene wax.

Comparative Example 2

Example 1 was repeated except that 0.0008 parts by weight of erucamide with 95% amide, acid value 4, and melting range 169–187° F. was used in place of the synthetic polyethylene wax.

Comparative Example 3

Comparative Example 2 was repeated except that the amount of erucamide added was changed to 0.003 parts by weight.

Comparative Example 4

Example 1 was repeated except that no synthetic polyethylene wax was added.

The various properties in the Examples and Comparative Examples were measured by the following methods:

A) Transparency of the film was measured by measuring the haze of a single sheet of film measured substantially in accordance with ASTM D1003. In general, the preferred value was less than 2.0% haze.

B) Gloss of the film was measured via a surface reflectivity gloss meter at 60°/60°angle.

C) Wetting tension of the film was measured using dyne solutions substantially in accordance with ASTM D2578.

D) Printability was measured by drawing down blue ink onto a single sheet of film using a meyer rod; drying the sheet in a hot air convection oven at 60° C. for 1 minute; and noting the amount of ink removal when a strip of 1-inch wide 610 tape was applied and removed from the inked surface. The amount of ink removed was rated qualitatively with 5 equaling no ink removed and 1 equaling total ink removal. In general, the preferred value was 4–5.

E) Slipperiness of the film was measured by measuring static and kinetic COF of sheets of film via a surface property tester substantially in accordance with ASTM D1894. In general, the preferred value of the dynamic COF was between 0.22 and 0.45.

F) Cold seal release force was measured by coating a standard BOPP treated film with Findley 1099C cold seal adhesive with a meyer rod; the adhesive coated film was placed in contact with the candidate cold seal release film; the construction was placed in a block tester under 100 psi pressure and left to stand for 16 hours under two conditions: Ambient (23° C.) and Heat-aged (50° C.). After aging, the films were peeled apart on an Instron tensile tester and the average load measured. In general, the preferred value for ambient release force was less than 75 g/in; the preferred value for heat-aged release force was less than 100 g/in.

G) Cold seal adhesion strength was measured by taking the adhesive coated film used in (F) above, folding the coated film sheet in half such that the adhesive coating was on the inside, and sealing the two coated halves together in a Sentinel pressure sealer Model 12 at 20 psi, 0.5 sec dwell, unheated seal bars. The sealed film was then peeled apart on an Instron tensile tested and the maximum load measured. In general, the preferred value for seal strength was 400 g/in or greater. Less than 300 g/in seal strength indicated deadening of the adhesive.

The properties of the films of the foregoing examples ("Ex.") and comparative examples ("CEx.") are shown in Table 1.

TABLE 1

| Sample | Gauge | Haze (%) | Print side Gloss (@ 60/80) | Print side Wetting Tension (dynes/cm) | Printability (scale 1–5; (5 = best, 1 = worst) | Release side COE (sL/dy) | Cold Seal Release (g/in) | | Cold Seal Strength (g/in) | |
|---|---|---|---|---|---|---|---|---|---|---|
| | | | | | | | Ambient-aged | Heat-aged | Ambient-aged | Heat-aged |
| Ex. 1 | 50 | 14 | 148 | 41 | 5 | 0.32/0.29 | 38 | 60 | 447 | 486 |
| Ex. 2 | 50 | 12 | 147 | 41 | 5 | 0.35/0.30 | 42 | 65 | 463 | 481 |
| Ex. 3 | 50 | 13 | 148 | 41 | 5 | 0.33/0.31 | 52 | 62 | 425 | 452 |
| Ex. 4 | 50 | 14 | 147 | 41 | 5 | 0.34/0.32 | 32 | 45 | 427 | 461 |
| Ex. 5 | 50 | 14 | 147 | 41 | 5 | 0.35/0.33 | 25 | 28 | 451 | 458 |
| Ex. 6 | 50 | 15 | 146 | 41 | 5 | 0.33/0.30 | 34 | 32 | 464 | 493 |
| Ex. 7 | 50 | 18 | 146.0 | 42 | 5 | 0.28/0.25 | 40 | 63 | 455 | 489 |
| Ex. 8 | 50 | 17 | 145.0 | 42 | 5 | 0.23/0.20 | 38 | 58 | 420 | 442 |
| CEx. 1 | 50 | 19 | 130 | 41 | 4 | 0.20/0.19 | 45 | 136 | 373 | 443 |
| CEx. 2 | 50 | 12 | 147 | 41 | 4 | 0.30/0.26 | 41 | 83 | 664 | 400 |
| CEx. 3 | 50 | 21 | 121 | 41 | 3 | 0.31/0.20 | 152 | Blocked | 336 | Blocked |
| CEx. 4 | 50 | 15 | 144 | 41 | 5 | 0.33/0.30 | 73 | 158 | 522 | 590 |

Cold seal adhesive used = Findley 1099C

Table 2 shows the results of selected samples that were aged for 6 months at ambient conditions in an outside warehouse and subjected to varying seasonal temperature and humidity changes. Cold seal release force and cold seal adhesive strength were measured after the aging per the procedures listed above.

TABLE 2

| Sample | Age of Sample | Cold Seal Release (g/in) | | Cold Seal strength (g/in) | |
|---|---|---|---|---|---|
| | | Ambient | Heat-aged | Ambient | Heat-aged |
| Ex. 1 | 6 months | 52 | 67 | 505 | 475 |
| CEx. 1 | 6 months | 278 | 495 | 496 | 613 |
| CEx. 2 | 6 months | 38 | 520 | 370 | 400 |
| CEx. 3 | 6 months | 28 | 489 | 73 | 306 |
| CEx. 4 | 6 months | 83 | 136 | 426 | 625 |

Cold Seal Adhesive = Findley 1099C

The above description is presented to enable a person of ordinary skill in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

What is claimed is:

1. A two-layer laminate film having a treated surface and an untreated cold seal release surface and comprising:

a) a first resin layer comprising a polyolefin resin and having thereon the treated surface treated by a discharge treatment method that imparts printability to the treated surface; and b) a second resin layer formed on and adhered to a surface of the first resin layer opposite the treated surface and providing the cold release surface, the second resin layer comprising resin, a first additive material in an amount of 2–10% by weight of the second resin layer, and a second additive in an amount of about 0.10–0.50% by weight of the second resin layer, in which the resin of the second resin layer consists essentially of polypropylene, the first additive material is at least one component selected from the group consisting of synthetic waxes and mineral-derived waxes and the second additive comprises an amorphous aluminosilicate.

2. The two-layer laminate film according to claim 1, wherein the first resin layer has a thickness of about 6–40 μm.

3. The two-layer laminate film according to claim 1 or 2, wherein the polyolefin resin of the first resin layer consists essentially of a polypropylene resin.

4. The two-layer laminate film according to claim 1 or 2, wherein the second resin layer has a thickness of about 0.2–5.0 µm.

5. The two-layer laminate film according to claim 1, wherein the first additive material comprises a synthetic or mineral wax having a viscosity at 210° F. of 40–150 ssu per ASTM D88, a penetration at 77° F. of 0–25 din per ASTM D1321, and a melting point of 175–220° F. per ASTM D127.

6. The two-layer laminate film according to claim 1, wherein the second additive material comprises an amorphous sodium calcium aluminosilicate having a particle size of 2–5 µm and a bulk density of 0.30–0.80 g/cm³ or an amorphous aluminosilicate having a particle size of 2–5 µm and a bulk density of 0.10–0.30 g/cm³.

7. The two-layer laminate film according to claim 1, wherein the second additive material comprises a crosslinked silicone resin having a spherical average particle size of 2–5 µm, a specific gravity of 1.32 at 25° F., a bulk density of 0.15–0.50, and a linseed oil absorption rate of 50–90 ml/10 g.

8. The two-layer laminate film according to claim 1, wherein the first additive material comprises a synthetic or mineral wax having a viscosity at 300° F. of 200–400 ssu per ASTM D88, a penetration at 77° F. of 0.0–25 dmm per ASTM 1321, and a melting point of 200–300° F. per ASTM D127.

9. The two-layer laminate film according to claim 1, wherein the second additive material comprises an amorphous aluminosilicate having a particle size of 2–5 µm and a bulk density of 0.10–0.30 g/cm³.

10. The two-layer laminate film according to claim 1, wherein the second additive material comprises a silicone oil having a viscosity of 300–400 cSt., a specific gravity at 77° F. of 0.90–0.99, and a volatiles content of 0.001–0.005%.

11. The two-layer laminate film according to claim 1 or 2, wherein the polyolefin resin of the first resin layer consists essentially of a polypropylene homopolymer.

12. The two-layer laminate film according to claim 1 or 2, wherein the resin of the second resin layer is polypropylene homopolymer.

* * * * *

UNITED STATES PATENT AND TRADEMARK OFFICE
CERTIFICATE OF CORRECTION

PATENT NO. : 6,503,611 B1
DATED : January 7, 2003
INVENTOR(S) : Keunsuk P. Chang et al.

It is certified that error appears in the above-identified patent and that said Letters Patent is hereby corrected as shown below:

<u>Column 6,</u>
Line 55, after "comprising", add -- a --;
Line 59, after "resin of the second", delete "resin";

<u>Column 7,</u>
Line 10, change "din" to -- dmm --;
Line 22, change "ml/10 g" to -- ml/100 g --.

Signed and Sealed this

Fourteenth Day of October, 2003

JAMES E. ROGAN
*Director of the United States Patent and Trademark Office*